United States Patent
Lidikay et al.

[11] 3,825,044
[45] July 23, 1974

[54] DRIVE APPARATUS FOR METERING APPARATUS

[75] Inventors: Lyle M. Lidikay; Sheldon L. Wilde, both of Crawfordsville, Ind.

[73] Assignee: H-C Industries, Inc., Crawfordsville, Ind.

[22] Filed: May 30, 1972

[21] Appl. No.: 257,862

[52] U.S. Cl.................... 141/187, 74/395, 141/188, 425/261
[51] Int. Cl............................................. B65b 43/50
[58] Field of Search........... 141/183, 187, 188, 190, 141/191; 425/256, 261; 118/317, 319; 74/395

[56] References Cited
UNITED STATES PATENTS

| | | | |
|---|---|---|---|
| 1,101,245 | 6/1914 | Bentley | 141/187 |
| 3,162,522 | 12/1964 | Tingley | 425/261 X |
| 3,166,947 | 1/1965 | Hendershot | 74/395 X |
| 3,196,810 | 7/1965 | Roth | 141/188 X |
| 3,377,986 | 4/1968 | Everett | 118/317 |
| 3,385,125 | 5/1968 | Plumb | 74/395 |
| 3,414,938 | 12/1968 | Caviglia | 425/114 |
| 3,683,875 | 8/1972 | Chadwick | 74/395 X |

Primary Examiner—Houston S. Bell, Jr.
Assistant Examiner—Charles Gorenstein
Attorney, Agent, or Firm—Dressler, Goldsmith, Clement & Gordon, Ltd.

[57] ABSTRACT

The disclosure relates to an apparatus for driving a metering type charge depositing apparatus that includes a conveyor advancing a plurality of open-topped receiving devices in predetermined relation along a receiving path with means above the path for supplying a constant supply of plastic material along a vertical path toward the receiving path and cutting means for removing a predetermined amount of the constant supply for deposit into a receiving device. The apparatus for driving includes first drive means for driving the conveyor at a predetermined rate and second drive means for driving the cutter means, which includes first and second rotating cutters, at a constant rate synchronous to said predetermined rate. First adjustable means cooperates with the second drive means for coordinating the cutter means relative to the conveyor to insure that the severed amounts of plastic material are deposited in the centers of the opentopped receiving devices. The drive means also includes second adjustable means for varying the engaging relationship of the first and second cutters relative to the constant supply of plastic material to control the orientation of the plastic material when it is received into the open-topped receiving devices.

16 Claims, 1 Drawing Figure

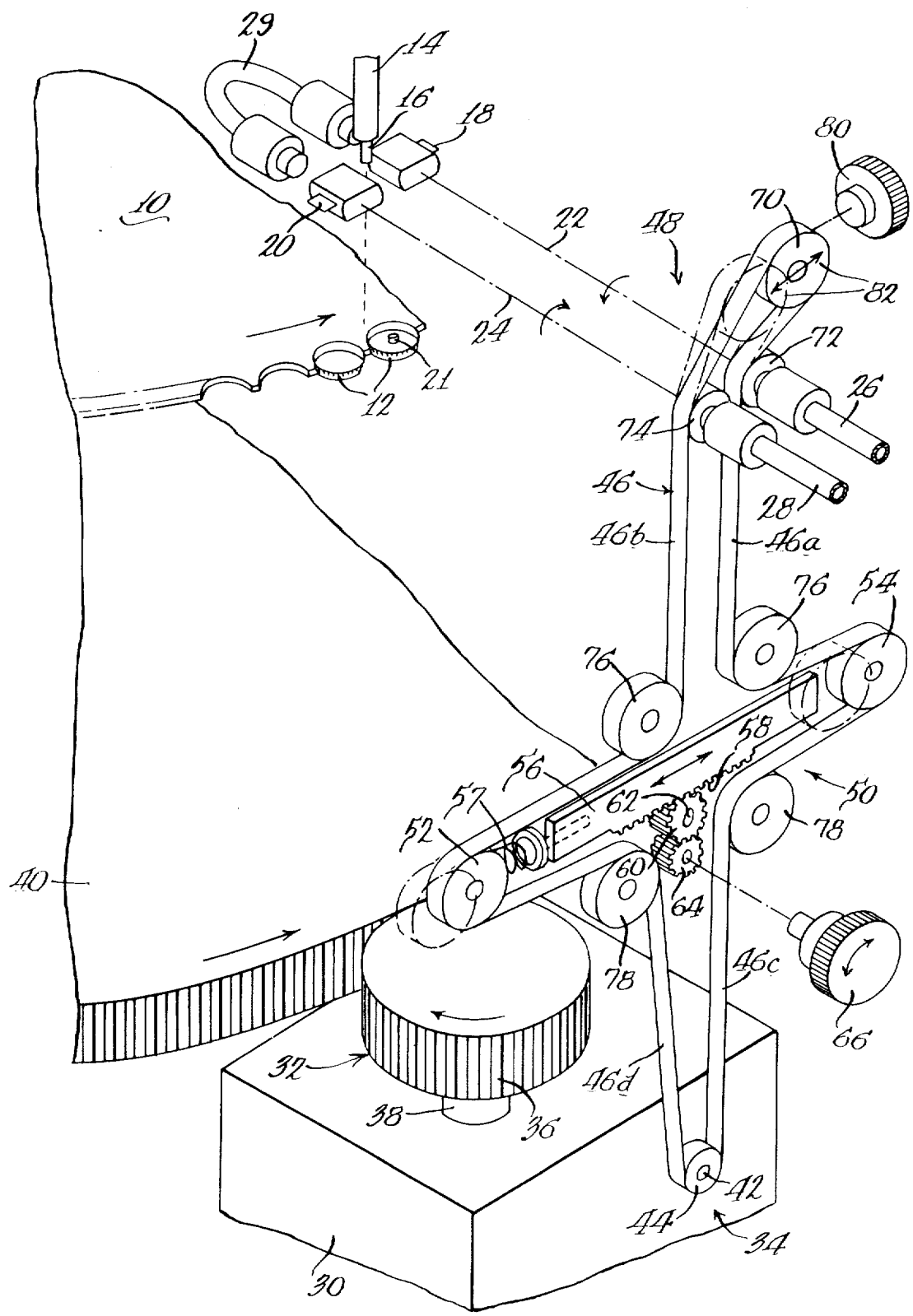

DRIVE APPARATUS FOR METERING APPARATUS

BACKGROUND OF THE INVENTION

This invention relates to a plastic processing system, and more particularly to a drive system for moving open-topped receiving devices along a path and accurately positioning measured amounts of an extrudate in plastic form in the centers of the receiving devices in predetermined orientation.

In recent years, a plastic interior liner has been utilized to replace the cork that is normally found in a crown cap for a bottle. In the production of such plastic lined crown caps, a slug of plastic is inserted into the crown cap and is molded to produce the plastic interior liner. In such an operation, it is necessary that the hot plastic slugs are of uniform size and that they are accurately directed into the caps while the caps are moving along a path at a relatively high speed.

One type of molding operation that has found a remarkable degree of commercial success in the production of plastic lined crown caps is that disclosed in Caviglia U.S. Pat. No. 3,414,938. In the system disclosed in this patent, hot plastic is extruded into the elongated endless rod that is cut with synchronous counterrotating blades that rotate on axes transverse to an extrudate path so that severed portions of the rod of extrudate are deposited into open-topped receiving devices moving along a receiving path.

While such a unit has found wide acceptance in the industry, difficulties have been encountered in insuring that the plastic material is deposited into the center of the receiving gap. It will be appreciated that if the plastic material is located at any place other than the center of the receiving device, problems are created to produce a uniform thick plastic interior liner in all portions of a receiving device or crown cap.

It has also been determined that sometimes it may be desirable to accurately control the orientation of the plastic material that is received into the crown caps. For example, sometimes it may be desirable to have the severed portion of the rod of plastic deposited in axial end-to-end relationship on the surface of the crown cap while, at other times, it may be desirable to have the severed portion of the rod oriented so that the axis of the severed portion of the rod extends parallel to the surface of the crown cap.

Such adjustments require that the machine be shut down and the drive mechanism realigned to center the plastic slug at the desired orientation.

SUMMARY OF THE INVENTION

The present invention contemplates a simple drive mechanism for a high speed molding unit, which can readily be adjusted while the unit is operating, to insure that the severed portions of a continuous plastic extrudate rod are deposited in the centers of the open-topped receiving devices or crown caps. The drive mechanism also incorporates means for controlling the orientation of the severed portion of the plastic extrudate as it is received into the crown caps.

The metering type charging apparatus into which the drive means of the present invention is incorporated consists of a conveyor for advancing a plurality of open-topped receiving devices in predetermined spaced relation along a receiving path with extruder means above said path for progressively feeding a rod of hot plastic material along a vertical path towards the receiving path and cutting means in the form of first and second cutters on opposite sides of the vertical path for successively severing the rod to deposit a separated portion of the rod into each device.

The drive means consists of first means for driving the conveyor at a predetermeind rate and second means for driving the cutter means at a constant rate synchronous to the predetermined rate for the conveyor. The second means incorporates the adjustable means that coordinates the cutter means with the movement of the conveyor so that the severed portions of the rod are deposited into the centers of the receiving devices and additional adjustable means for controlling the cutter means to control the orientation of the severed portions relative to the surface of the receiving device.

More specifically, the second drive means includes a first drive sprocket wheel driving an endless belt that cooperates with a pair of driven sprocket wheels respectively connected to the first and second cutters.

The first adjustable means consists of a pair of idler sprocket wheels that are supported on a movable carrier and engage the endless belt between the driven sprocket wheels connected to the cutters and the drive sprocket wheel. The carrier has gear teeth defined thereon that are engaged by a rotatable gear so that the carrier and the idler sprocket wheels supported thereon may be shifted laterally relative to the direction of movement of the endless belt and the lateral shifting of the idler sprocket wheels will change the orientation of the drive for the cutters relative to the conveyor without changing the speed for either the conveyor or the cutters.

The second adjustable means consists of an additional idler sprocket wheel engaging the endless belt above the two driven sprocket wheels connected to the respective cutters, which have blades associated therewith, with means for moving the idler sprocket wheel to vary the engaging relationship of the cutter blades with respect to the extrudate rod and thereby control the orientation and trajectory of the severed portion as it is received into the receiving device.

Both adjustable means are designed so that the cutter blades and the conveyor or finger bar can be properly coordinated relative to each other and the engaging angular relationship of the cutter blades with respect to the plastic extrudate may be changed while the machine is in operation.

BRIEF DESCRIPTION OF DRAWING

The single view in the drawing shows a perspective view of the drive mechanism of the present invention incorporated into a metering apparatus.

DETAILED DESCRIPTION

While this inventon is susceptible of embodiment of many different forms, there is shown in the drawing and will herein be described in detail one embodiment, with the understanding that the present disclosure is to be considered as an exemplication of the principles of the invention and is not intended to limit the invention to the embodiment illustrated.

The metering apparatus utilizing the principles of the present invention is illustrated in the drawing and includes an endless conveyor or finger bar 10 supported for rotation about a fixed vertical axis (not shown)

which supports a plurality of open-topped receiving devices or crown caps 12 and moves the caps along a receiving path. Extruder nozzle 14 is positioned above the receiving path for the receiving devices or crown caps 12 and produces a continuous supply of extrudate 16 directed along a vertical path towards the receiving path defined by conveyor 10. While nozzle 14 is shown vertical, it could be angularly disposed if desirable.

Cutter means consisting of first and second cutter blades 18 and 20 that are supported for rotation on shafts 22 and 24 are respectively rotated about horizontal axes on opposite sides of extrudate 16. The cutter blades are driven in synchronous, counter-rotation so that, when they are disposed towards one another in horizontal alignment, the outer edges of the respective blades sustantially meet along a line which passes through the center axis of extruder nozzle 14. Each time the blades meet, extrudate rod 16 is severed and rod portion 21 is deposited into an open-topped receiving device 12 by the combination of the forces imparted to it by the knives and gravity.

The metering apparatus also includes a fluid cooling system of the type disclosed in the above mentioned patent, and for this purpose, shafts 22 and 24 are hollow and have pipes 26 and 28 connected to one end for supplying the fluid, such as cold water. The opposite ends of hollow shafts 22 and 24 are interconnected through coupling means 29.

As was indicated above, it is extremely important to insure that the portions of the extrudate that are successively severed are directed to the centers of the crown caps. The present invention provides a drive mechanism for the conveyor and the cutters that can be adjusted by an operator while the machine is in motion to insure that a severed portion of the extrudate is deposited in the center of the crown cap.

As shown in the drawing, the apparatus for driving the conveyor and cutter means consists of drive member 30, such as an electric motor, with first drive means 32 driven by drive member 30, for driving conveyor 10 at a predetermined rate and second drive means 34, driven by drive member 30 for driving the cutter means at a constant rate synchronous to the predetermined rate for the conveyor. While a single source of power has been disclosed, it is readily apparent that the two means could be driven by separate power sources that are synchronized.

First drive means 32 consists of gear 36 fixed to output shaft 38 from drive member 30 and engaging gear teeth on enlarged drive gear 40 fixedly secured to conveyor 10 by suitable means (not shown). Rotation of gear 36 at a constant rate with drive conveyor at a constant predetermined rate. Since crown caps 12 are equally spaced on conveyor 10, crown caps will be moving at a predetermined rate and in predetermined spaced relation along a receiving path.

Second drive 34 includes shaft 42 driven by member 30 at a rate synchronous to the predetermined rate for conveyor 10. Shaft 42 has drive sprocket wheel 44 secured thereto which drives endless chain belt 46. Endless belt 46 drives cutter blades 18 and 20 through drive mechanism 48 spaced from drive sprocket wheel 44. Since sprocket wheel 44 is driven directly by the same power source for conveyor drive 32, cutter blades 18 and 20 are driven in synchronous relation with conveyor 10.

According to the invention, the driving relation between drive sprocket wheel 44 and cutter drive mechanism can be changed while the unit is operating by adjustable means 50 so that separated portions of the rod of hot plastic material are deposited in the centers of the crown receiving caps.

Adjustable means 50 includes a pair of idler sprocket wheels 52, 54 engaging endless belt 46 at a location between drive sprocket wheel 44 and cutter drive mechanism 48. Sprocket wheels 52 and 54 are supported on carrier 56 and one of the idler sprocket wheels is biased away from carrier 56 by biasing means 57, for a purpose that will be described later. Carrier 56 has gear teeth 58 defined on one surface thereof that are engaged by gear teeth on rotatable gear 60 supported on fixed axis 62 adjacent carrier 56. The means for shifting carrier 56 includes second gear 64 having knob 66 secured thereto and having teeth engaging gear teeth on gear 60.

Before describing the operation of adjustable means 50, the remainder of second drive means 34 will be described. Cutter drive mechanism 48 includes idler sprocket wheel 70 and drive sprocket wheels 72 and 74 respectively connected to shafts 22 and 24 for rotating cutter blades 18 and 20.

Second drive means from drive member 30 also includes two additional pairs of idler sprocket wheels 76 and 78 that respectively engage an opposite surface of endless belt 46 above and below carrier 56. Idler sprocket wheels 76 are positioned to define substantially vertically extending belt segments 46a and 46b that respectively engage driven sprocket wheels 72 and 74, while idler sprocket wheels 78 are positioned to define substantially vertical belt segments 46c and 46d below carrier 56.

The adjustment of the synchronous relation between conveyor 10 and cutter blades 18 and 20 will now be described. Assuming that the drive means 30 is inoperative, shaft 42, drive sprocket wheel 44 and idler sprocket wheels 78 will define a fixed position for the lower end of endless belt 46. Shifting carrier 56 to the left as viewed in the drawing, by rotation of knob 66 in a clockwise direction will locate the idler sprocket wheels 52 and 54 in the dotted line position shown in the drawings. Since the lower portion of endless belt 46 remains fixed below idler pulleys 78, belt segment 46a must be moved upwardly while belt segment 46b must move downwardly to accommodate the lateral shifting of idler sprocket wheels 52, 54. This will cause cutter blade 18 to be rotated clockwise while cutter blade 20 will be rotated counter-clockwise an equal amount. The result will be that the two blades will be engaging the plastic rod at a different time and thereby reposition the severed portion of the rod with respect to the receiving path defined by conveyor 10. As was indicated above, such adjustment may readily take place while the machine is in operation so that the operator can accurately position the respective severed portions in the center of the respective crown caps.

According to a further aspect of the invention, the drive means also incorporates second adjustment means for changing the pitch adjustment of the blades with respect to each other. The changing of the pitch adjustment of the blades with respect to each other changes the angular relationship between the blades on shafts 22 and 24 to provide for variations in the severed portion orientation when it is deposited on the upper surface of the crown cap.

The second adjustment is produced by laterally shifting idler sprocket wheel 70 transversely to the horizontal axes of the shafts 22 and 24. Thus, assuming again the entire drive mechanism is stationary, movement of idler sprocket wheel 70 from the solid line position shown in the drawing to the dotted line position will produce some slack in belt segment 46b which will automatically be taken up by the movement of idler sprocket wheel 52 from the force of biasing means 57 to the left which in turn will cause a counter-clockwise rotation of the driven sprocket wheel 74 while driven sprocket wheel 72 remains stationary. This adjustment will change the engaging relationship of the respective cutter blades with respect to plastic extrudate or rod 16 to change the orientation of the severed portion with respect to the surface of the crown cap 12. The lateral adjustment of idler sprocket wheel 70 may be again accomplished through any suitable means interposed between control knob 80 and a carrier (not shown) for idler sprocket wheel 70. For example, the end of rotatable knob could have a worm gear defined thereon engaging teeth on an elongated carrier supported for movement transversely of the axes of shafts 22 and 24 with the idler sprocket wheel 70 supported for rotation about a fixed axis on the carrier 70. Suffice it to say that rotation of knob 80 in either direction will cause idler sprocket wheel 70 to move laterally in opposite directions indicated by arrows 82.

Thus, it will be seen that the present invention provides a simple and inexpensive expedient of adjusting the position and orientation of a severed portion of extrudate relative to the surface of a crown cap.

We claim:

1. In a metering apparatus that includes a conveyor for advancing a plurality of open-topped receiving devices in predetermined spaced relation along a receiving path, means for progressively feeding a rod of hot plastic material above said path; cutter means including cutter blades engaging opposite sides of said rod for successively severing the rod to deposit a separated portion in each device; and drive means for said conveyor and cutter means, said drive means including first means for driving said conveyor at a predetermined rate; second means for driving said cutter means at a constant rate synchronous to said predetermined rate; and adjustable means for changing the position of said cutter blades relative to each other to insure that said separated portions of said rod are deposited into the centers of said devices.

2. Apparatus as defined in claim 1, in which said second means includes an endless belt; a drive sprocket wheel driving said belt; and mechanism spaced from said drive sprocket wheel and cooperating with said belt for driving said cutter means; and in which said adjustable means includes first and second idler sprocket wheels engaging said belt between said first sprocket wheel and said mechanism; a carrier supporting said idler sprocket wheels; and means for shifting said carrier transversely of the direction of movement of said belt to change the driving orientation between said conveyor and cutter means.

3. Apparatus as defined in claim 2, in which said means for shifting includes gear teeth on said carrier and a gear engaging said gear teeth, said gear being rotatable about a fixed axis to shift said idler sprocket wheels.

4. Apparatus as defined in claim 2, in which said cutter blades are counter-rotating blades rotated about horizontal axes of rotation respectively located on opposite sides of said rod, and in which said mechanism includes a further idler sprocket wheel and driven sprocket wheels respectively connected to said rotating blades, said driven sprocket wheels engaging opposite sides of said endless belt for driving said rotating blades; biasing means maintaining tension on said belt; and means for moving said further idler sprocket wheel to vary the engaging relationship of said blades with said rod thereby varying the orientation of said severed separated portions with respect to the receiving devices.

5. Apparatus as defined in claim 1, in which said cutter blades are first and second counter-rotating cutter blades respectively rotated about horizontal axes of rotation on opposite sides of said rod and said first and second means are driven by a common drive member; and in which said second means includes an endless belt, a first drive sprocket wheel driven by said drive member and driving said belt; a pair of driven sprocket wheels respectively rotating said cutter blades, said pair of driven sprocket wheels respectively engaging opposite sides of said belt and a first idler sprocket wheel engaging said belt on the side of said driven sprocket wheels remote from said common drive member and in which said adjustable means includes a pair of idler sprockets engaging said belt between said first driven sprocket wheel and said pair of driven sprocket wheels, said pair of idler sprocket wheels being simultaneously laterally shiftable to change the driving orientation of said cutter means with respect to said conveyor.

6. Apparatus as defined in claim 5, further including biasing means cooperating with one of said pair of idler sprocket wheels for maintaining tension on said belt; and means for laterally shifting said first idler sprocket wheel relative to said horizontal axes to change the angular position of said blades relative to each other.

7. In a metering apparatus that includes a conveyor for advancing a plurality of open-topped receiving devices in predetermined spaced relation along a receiving path, means for progressively feeding a rod of hot plastic material above said path, first and second cutter blades respectively rotated about horizontal axes on opposite sides of said rod for successively severing the rod to deposit a separated portion in each device, and drive means for said conveyor and cutter blades, said drive means including first means for driving said conveyor at a predetermined rate, second means for driving said cutter blades at a constant rate synchronous to said predetermined rate, and adjustable means in said second means for varying the engaging relationship of said blades with respect to said rod to control the orientation of said severed separated portions when they are received in said receiving devices.

8. Apparatus as defined in claim 7, in which said second means includes a drive sprocket wheel; an endless belt driven by said drive sprocket wheel; a first idler sprocket wheel engaging said endless belt and in which the first adjustable means includes a further pair of idler sprocket wheels engaging said belt intermediate said drive sprocket wheel and said first idler sprocket wheel, and means for laterally shifting said further pair of idler sprocket wheels relative to said drive sprocket wheel and said first idler sprocket wheel.

9. Apparatus as defined in claim 8, in which said second means includes first and second driven sprocket wheels respectively connected to said blades, said drive sprocket wheels engaging opposite sides of said belt; and said second adjustment means includes means for moving said first idler sprocket wheel relative to said first and second driven sprocket wheels to vary the engagement between said endless belt and said first and second driven sprocket wheels.

10. Apparatus as defined in claim 9, in which said means for laterally shifting said further pair of idler sprocket wheels includes a carrier supporting said further pair of idler sprocket wheels, said carrier having gear teeth defined thereon, and a rotatable gear engaging said gear teeth.

11. Apparatus as defined in claim 10, further including biasing means between one of said further pair of idler sprocket wheels and said endless belt for maintaining a predetermined tension on said belt.

12. Apparatus for driving a metering apparatus that includes a conveyor advancing a plurality of open-topped receiving devices in predetermined spaced relation along a receiving path with means above said path for supplying a constant supply of plastic material along a vertical path toward said receiving path and cutting means including first and second cutters on opposite sides of said vertical path for removing a predetermined amount of said constant supply for deposit into a receiving device comprising drive means for driving said conveyor at a predetermined rate; a drive sprocket wheel driven by said drive means; an endless belt driven by said drive sprocket wheel; first and second driven sprocket wheels respectively connected to said first and second cutters, said driven sprocket wheels being in driving relation with opposite sides of said endless belt; and adjustable means engaging with said endless belt for adjusting said first and second cutters relative to each other to insure that said predetermined amounts of plastic material are deposited in the centers of said open-topped receiving devices.

13. Apparatus as defined in claim 12, in which said adjustable means includes a laterally shiftable carrier; a first pair of idler sprockets on opposite ends of said carrier and engaging said belt, and means for laterally shifting said carrier to change the driving relation between said drive sprocket wheel and said first and second driven sprocket wheels.

14. Apparatus as defined in claim 13, further including two additional pairs of idler sprocket wheels, one of said two additional pairs of idler sprocket wheels engaging respective segments of said belt between said drive sprocket wheel and the first pair of idler sprocket wheels, the other of said additional pair of idler sprocket wheels engaging respective segments of said belt between the first pair of idler sprocket wheels and said first and second driven sprocket wheels.

15. In a metering apparatus including a conveyor for advancing a plurality of open-topped receiving devices in predetermined spaced relation along a receiving path; means for progressively feeding a rod of hot plastic material along a vertical path intersecting said receiving path; cutter means including a pair of counter-rotating cutter blades respectively rotatable about horizontal axes on opposite sides of said extrudate path for successively severing the rod into portions for deposit into a receiving device; first means for driving said conveyor at a predetermined rate; second means for driving said cutter blades at a constant rate synchronous to said predetermined rate; and adjustable means in said second drive means for changing the angular position of said blades relative to each other to thereby control the orientation of said portions when they are received into said receiving devices.

16. Apparatus as defined in claim 15, in which said second means includes an endless belt, first and second wheels respectively connected to said pair of cutter blades, said wheels being in driving engagement with opposite sides of said belt; an idler wheel above said belt; and in which said adjustable means includes means for laterally shifting said idler wheel, and tension means cooperating with said belt so that lateral shifting of said idler wheel will produce rotation of one of said first and second wheels relative to the other of said first and second wheels.

* * * * *